(12) United States Patent
Nowakowski et al.

(10) Patent No.: US 9,086,783 B2
(45) Date of Patent: Jul. 21, 2015

(54) METHODS AND SYSTEMS FOR USING SEARCH AND SELECT FORMS ON A MOBILE DEVICE

(75) Inventors: David Nowakowski, Thornton, CO (US); Darryl Shakespeare, Denver, CO (US); Aaron Johnson, Castle Pines, CO (US); Nicole Laurent, Lakewood, CO (US); Anish K. Mathew, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 13/468,635

(22) Filed: May 10, 2012

(65) Prior Publication Data

US 2013/0086526 A1    Apr. 4, 2013

Related U.S. Application Data

(60) Provisional application No. 61/541,682, filed on Sep. 30, 2011.

(51) Int. Cl.

| G06F 3/048 | (2013.01) |
| G06F 3/0482 | (2013.01) |
| G06F 3/0484 | (2013.01) |
| G06F 3/0481 | (2013.01) |
| G06F 17/30 | (2006.01) |
| G06Q 30/02 | (2012.01) |
| G06Q 30/06 | (2012.01) |

(52) U.S. Cl.
CPC .......... *G06F 3/0482* (2013.01); *G06F 3/04817* (2013.01); *G06F 3/04842* (2013.01); *G06F 17/30* (2013.01); *G06F 17/30277* (2013.01); *G06F 17/30864* (2013.01); *G06F 17/30867* (2013.01); *G06Q 30/02* (2013.01); *G06Q 30/0256* (2013.01); *G06Q 30/0633* (2013.01); *G06Q 30/0635* (2013.01)

(58) Field of Classification Search
CPC ............ G06F 17/30864; G06F 3/0482; G06F 17/30867; G06F 17/30; G06F 3/04842; G06F 3/04817; G06F 17/30277; G06Q 30/0633; G06Q 30/0256; G06Q 30/0635; G06Q 30/02
USPC ........ 715/825, 841, 845; 707/706; 705/14.54, 705/26.8, 26.81
See application file for complete search history.

(56) References Cited

U.S. PATENT DOCUMENTS

| 2006/0212836 A1* | 9/2006 | Khushraj et al. .............. 715/866 |
| 2008/0010248 A1* | 1/2008 | Vautier ............................. 707/3 |
| 2008/0086747 A1* | 4/2008 | Rasanen et al. ................. 725/46 |
| 2009/0158218 A1* | 6/2009 | Brooks et al. ................. 715/854 |
| 2010/0035596 A1* | 2/2010 | Nachman et al. ............. 455/418 |

* cited by examiner

*Primary Examiner* — William Bashore
*Assistant Examiner* — James F Sugent
(74) *Attorney, Agent, or Firm* — Kilpatrick Townsend & Stockton LLP

(57) ABSTRACT

Embodiments of the invention provide systems and methods for providing and using user interfaces for search and select forms on mobile devices. According to one embodiment, providing a user interface of a search function for an application can comprise generating the user interface including a plurality of controls. Each control can be associated with a search criteria and can provide for a selection of one or more values for the associated search criteria. The user interface can be provided to a mobile device. An indication of a selection of one of the controls can then be received from the mobile device. The user interface can be updated based on the selected control being associated with either a single-select criteria or a multi-select criteria. One or more values for the search criteria associated with the selected control can then be received through the updated user interface.

14 Claims, 14 Drawing Sheets

| | | |
|---|---|---|
| | Home | |
| Cancel | Expense Detail | Save |

| | |
|---|---|
| * Category: | Lunch Expense ▼ |
| * Date: | 04/23/2012  mm/dd/yyyy |
| * Location: | Brazil ▼ |
| * Paid With: | Cash ▼ |
| * Charge To: | Work Order ▼ — 502 |
| * Business Unit: | M30  🔍 — 503 |
| * Order Number: | _____  🔍 — 504 |
| Subsidiary: | |
| Currency: | USD ▼ |
| * Amount: | _____ USD |

Sign Out

METHODS AND SYSTEMS FOR USING SEARCH AND SELECT FORMS ON A MOBILE DEVICE

CROSS-REFERENCES TO RELATED APPLICATIONS

The present application claims benefit under 35 USC 119 (e) of U.S. Provisional Application No. 61/541,682, filed on Sep. 30, 2011 by Nowakowski et al. and entitled "Mobile Application Interface," of which the entire disclosure is incorporated herein by reference for all purposes.

BACKGROUND OF THE INVENTION

Embodiments of the present invention relate generally to methods and systems for search and select user interfaces and more particularly to providing and using user interfaces for search and select forms on mobile devices.

On a traditional search and select user interface, such as may be used to define criteria for performing a search of a database or other repository of information, the user is presented with a number of search parameters, a method to perform the search and a method to select a value and return it to the calling form. For example, when performing a search, it is common to provide a user interface such as a web page including a form through which this user can enter a value for a given field as input to define a particular search criterion. Additionally, interface may allow for multiple values to be selected, removed, and stored, for a given field, to define another particular search criterion. Depending upon the data being search and/or the application through which the search is being conducted, the number of these different types of search select fields can extensive. For example, an enterprise application such as an Enterprise Resource Planning (ERP) application can have a very large number of single-select and multi-select fields that can be presented and used to define a search for documents or other objects related to the application.

Mobile devices such as tablets and phones are increasingly being used to interact with such applications. On a mobile device, the reduced screen size and limited input methods require that applications interfaces are both space efficient and easy to control. However, typical search select forms, such as may be presented by a search feature of an enterprise application for example, can consume a large portion of a mobile screen. Additionally, the steps involved in selecting the values can be tedious on such a device. For mobile applications, the reduced screen size and limited input methods dictate that such controls be both compact and easy to use via touch. However, present approaches to providing and using search select interfaces on mobile devices have not adequately addressed these considerations. Rather, current approaches attempt to present the same interface typically presented in web page for rendering via a web browser without considering the confines of mobile display and input methods. Hence, there is a need for improved methods and systems for providing and using user interfaces for search and select forms on mobile devices.

BRIEF SUMMARY OF THE INVENTION

Embodiments of the invention provide systems and methods for providing and using user interfaces for search and select forms on mobile devices and within limits imposed by such devices. According to one embodiment, providing a user interface of a search function for an application can comprise generating the user interface including a plurality of controls. Each control can be associated with a search criteria and can provide for a selection of one or more values for the associated search criteria. The user interface can be provided to a mobile device. An indication of a selection of one of the controls can then be received from the mobile device. The user interface can be updated based on the selected control being associated with either a single-select criteria or a multi-select criteria. One or more values for the search criteria associated with the selected control can then be received through the updated user interface.

For example, updating the user interface based on the selected control can comprise replacing a criteria selection portion of the user interface with a compressed representation in the updated user interface, generating a list of values for the search criteria associated with the selected control, adding the list of values to the updated user interface, and providing the updated user interface with the compressed representation of the criteria selection portion and list of values to the mobile device. A selection of one or more values of the list can be received through the user interface and the compressed representation of the criteria selection portion can be replaced with the criteria selection portion in the updated user interface. An indication of the selected one or more values can be added to the criteria selection portion of the updated user interface and the updated user interface with the criteria selection portion and list and the indication of the selected one or more values can be provided to the mobile device.

A value for the search criteria associated with the selected control can be received through the selected control and an indication of the received value can be added to the criteria selection portion of the updated user interface. A search can then be performed using the received one or more values for the search criteria associated with the selected control, a criteria selection portion of the user interface can be replaced with a compressed representation in the updated user interface, results of performing the search can be added to the updated user interface, and the updated user interface with the compressed representation of the criteria selection portion and the results of performing the search can be provided to the mobile device. In some cases, the process can further include receiving an indication of a selection of a search result through the updated user interface, replacing the compressed representation of the criteria selection portion with the criteria selection portion in the updated user interface, adding to the criteria selection portion of the updated user interface an indication of the selected search result as an additional search criteria, and providing the updated user interface with the criteria selection portion and the indication of the selected search result as an additional search criteria to the mobile device. An additional search may then be performed using the received one or more values for the search criteria associated with the selected control and the additional search criteria.

BRIEF DESCRIPTION OF THE DRAWINGS

FIGS. 5A-5E are screenshots of exemplary user interfaces for defining single-select criteria according to one embodiment of the present invention.

FIGS. 6A-6E are screenshots of exemplary user interfaces for defining single-select criteria according to one embodiment of the present invention.

DETAILED DESCRIPTION OF THE INVENTION

Figure 1:
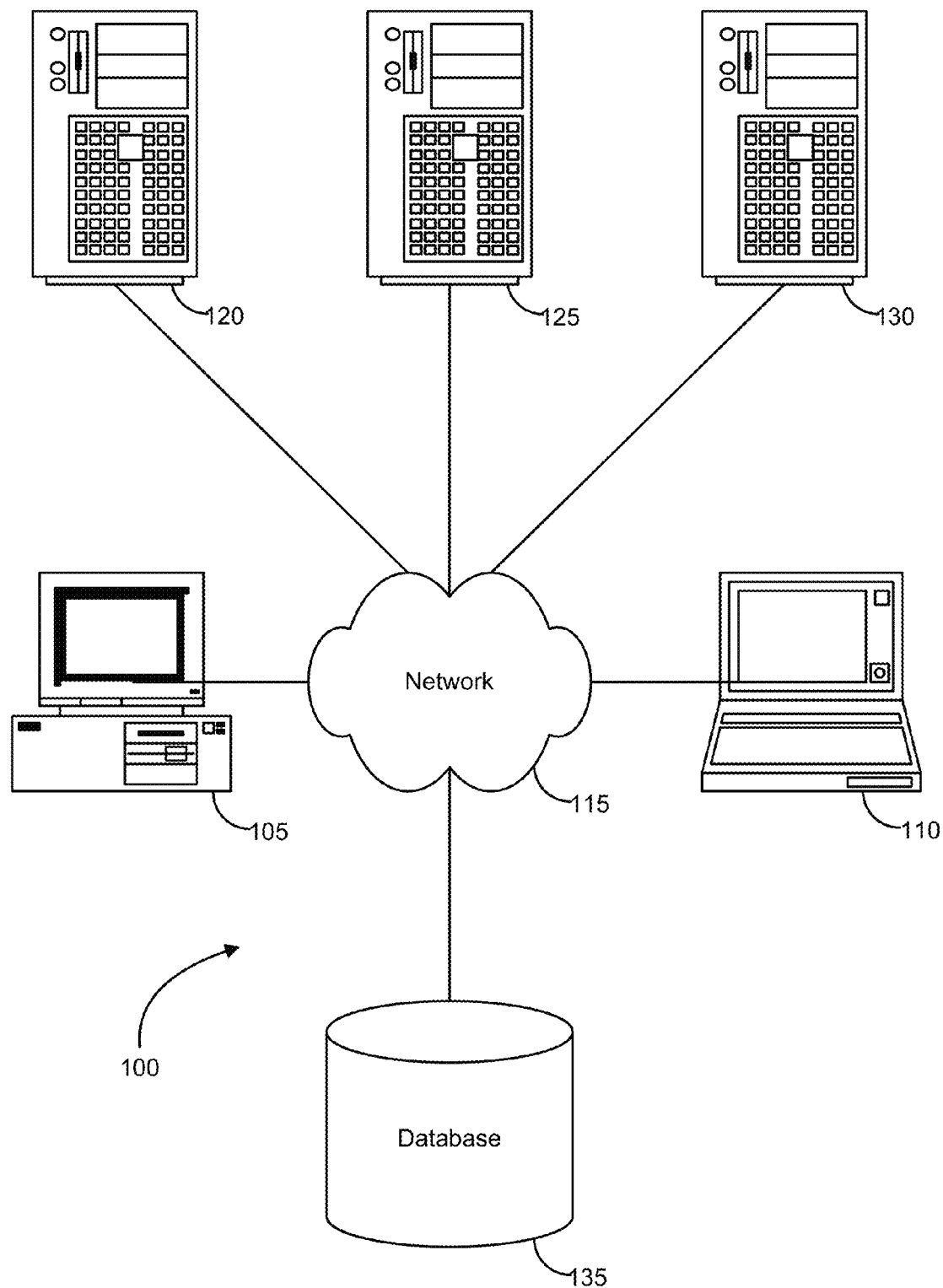
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing and using user interfaces for search and select forms on mobile devices and within limits imposed by such devices. More specifically, embodiments of the present invention provide for generating and providing a user interface for a performing a search. The user interface can have multiple fields for defining different criteria of the search. These fields can include both single-select fields for selecting and defining a single value for a given criteria as well as multi-select fields for selecting and defining more than one value for a given criteria.

Depending upon the field selected, the user interface can be updated to allow the selection but in a manner consistent with the limitations of a mobile device, i.e., within the display size and input method limitations of such a device, by prioritizing display of the results set over the input parameters while still providing a quick touch friendly way to see both. In addition, embodiments of the present invention simplify the select and return actions by reducing the interactions with the device and providing visual cues to the resulting behavior.

According to one embodiment, a multi-select field or control can allow a user to add any number of values to a single field that can then be used as input to a search. The control can consist of multiple UI elements in a recognizable pattern and can reduce the number of searches needed and presents it in a way that that is usable on a mobile device. In addition, it can provide for an efficient use of real estate by, according to one embodiment, displaying the selected value set in a 'toggle' view. In some cases, the detail list can be compressed, saving valuable screen space. In such cases, a touch on the control can expand the compressed list to its detail view. According to one embodiment, the expanded view can support in-place delete of values in the set. These features and functions can provide end user efficiency in adding, editing and displaying multi-select value sets on a mobile device. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
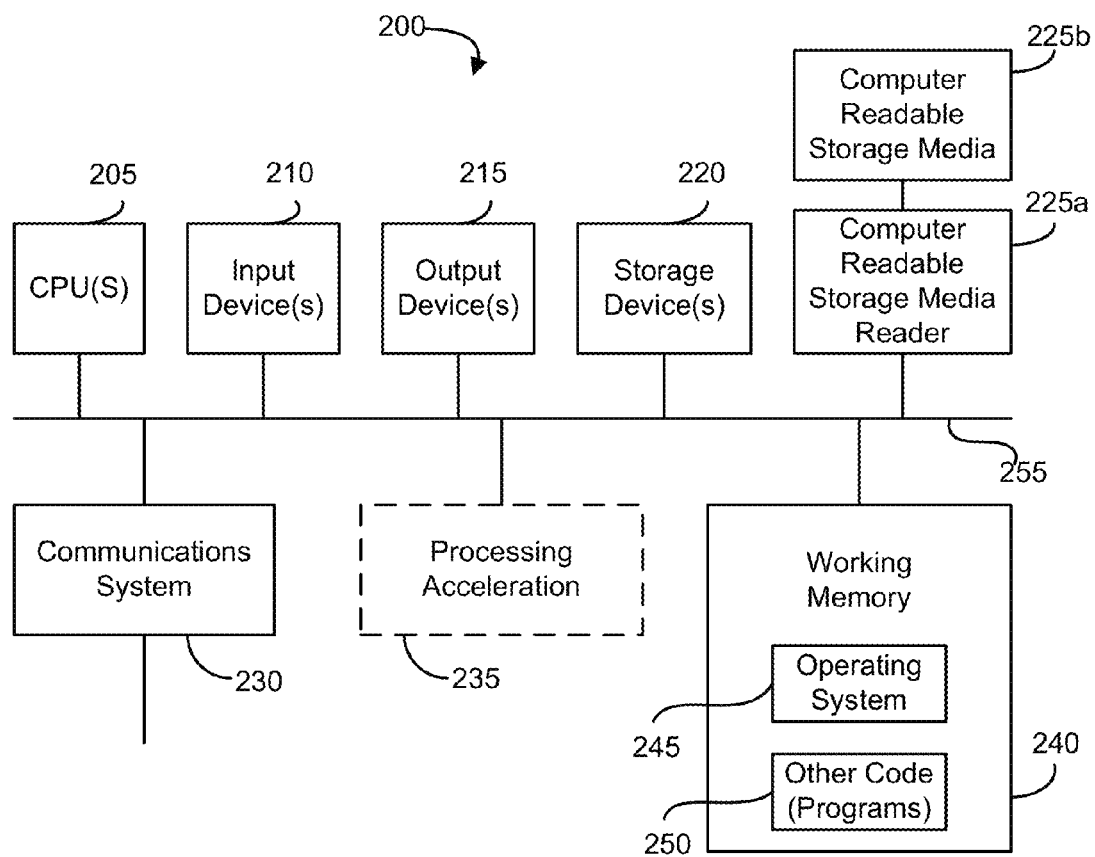
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer- readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
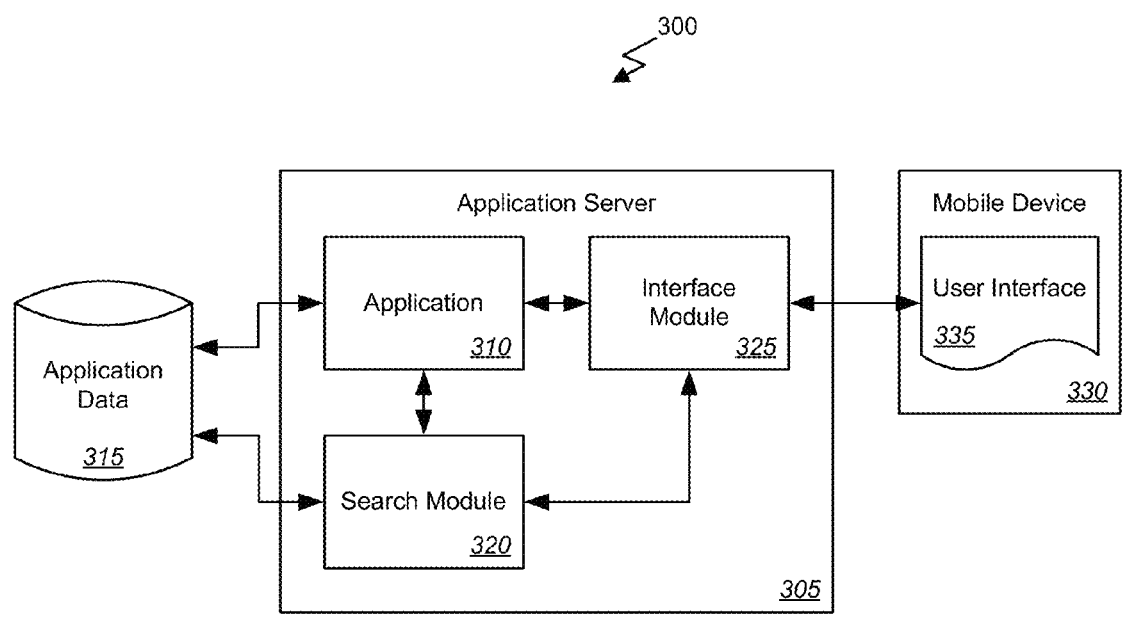
FIG. 3 is a block diagram illustrating, at a high-level, functional components of a system for providing and using user interfaces for search and select forms on mobile devices according to one embodiment of the present invention.

FIG. 3 is a block diagram illustrating, at a high-level, functional components of a system for providing and using user interfaces for search and select forms on mobile devices according to one embodiment of the present invention. As illustrated in this example, the system 300 can include an application server 305 or other computer as described above.

The system 300 can also include a mobile device 330 communicatively coupled with the application server 305 via a local or wide area network (not shown here) also as described above. As noted, the mobile device 330 can comprise any of a variety of different types of devices including but not limited to a phone, tablet, netbook, laptop, or other type of portable computing device. It should be understood that any number of other mobile or not-so-mobile devices not shown here for the sake of simplicity and brevity may also be connected with the application server 305 and can also utilize embodiments described herein.

The application server 305 can execute an application 310 including, by way of example but not limitation, an enterprise application such as an Enterprise Resource Planning (ERP) application, and maintain a set of application data 315 in a database or other repository. The application 310 executing on the application server 305 can interact with the mobile device 330 through an interface module 325 to present a user interface 335 on the mobile device 330 for presenting application information to and receiving information and instructions from a user of the mobile device 330. For example, the user of the mobile device 330 can request though the interface 335 presented on the mobile device 330 and the interface module 325 of the application server for the application 310 to perform particular functions. In some cases, the request may be for the application 310 to identify and return to the mobile device certain application data 315. In response, the application 310 and search module 320 can perform a search of the application data 315 and return results to the mobile device 330 through the interface module 325 to be presented in the user interface 335 of the mobile device 330.

As noted above, embodiments of the invention are directed to the user interface 335 of the mobile device 330 and provide for using search and select forms on the mobile device 330 within limits imposed by such a device. More specifically, embodiments of the present invention provide for generating and providing a user interface 335 for a performing a search. Examples of the user interface 335 are illustrated in and will be described in greater detail below with reference to FIGS. 5A-5E and 6A-6E. Additionally, details of processes performed by the application 310, search module 320, interface module 325, and/or mobile device 330 in providing and using such interfaces 335 will be described in greater detail below with reference to FIG. 4. However, generally speaking, the user interface 335 can have multiple fields for defining different criteria of the search. These fields can include both single-select fields for selecting and defining a single value for a given criteria as well as multi-select fields for selecting and defining more than one value for a given criteria. Depending upon the field selected, the user interface can be updated to allow the selection but in a manner consistent with the limitations of a mobile device 330, i.e., within the display size and input method limitations of such a device, by prioritizing display of the results set over the input parameters while still providing a quick touch friendly way to see both.

Figure 4:
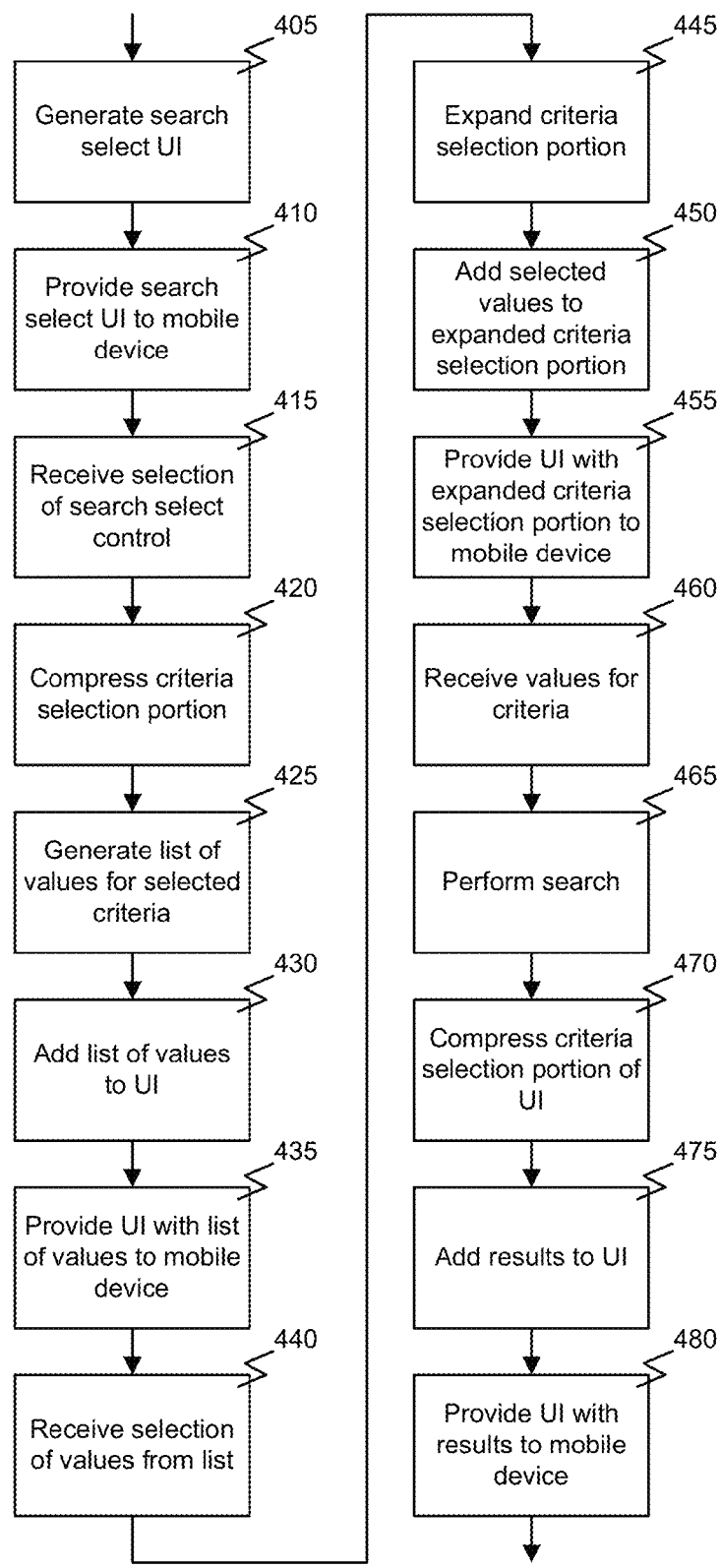
FIG. 4 is a flowchart illustrating a process for providing and using user interfaces for search and select forms on mobile devices according to one embodiment of the present invention.

FIG. 4 is a flowchart illustrating a process for providing and using user interfaces for search and select forms on mobile devices according to one embodiment of the present invention. A method for providing a user interface of a search function for an application can begin with generating 405 the user interface including a plurality of controls. Each control can be associated with a search criteria and can provide for a selection of one or more values for the associated search criteria. The user interface can be providing 410 to a mobile device for display to a user. Examples of such interfaces for a mobile device are illustrated in and described below with reference to FIGS. 5B and 6A. An indication of a selection of one of controls can be received 415 from the mobile device. For example, the indication may be received in response to or based on the user touching or otherwise manipulating the interface of the mobile device to select one of the displayed controls. The user interface can be updated 420-455 based on the selected control being associated with either a single-select criteria or a multi-select criteria.

More specifically, updating the user interface based on the selected control can comprise replacing 420 a criteria selection portion of the user interface with a compressed representation in the updated user interface. A list of values for the search criteria associated with the selected control can be generated 425 and adding 430 to the updated user interface. The updated user interface with the compressed representation of the criteria selection portion and list of values can be provided 435 to the mobile device. Examples of such interfaces for a mobile device are illustrated in and described below with reference to FIGS. 5C and 6B.

A selection of one or more values of the list can be received 440 through the user interface, for example by the user touching, clicking, or otherwise manipulating the user interface to indicate one or more selections depending upon whether the selected control is a single-select or a multi-select control. Once one or more values have been selected, the compressed representation of the criteria selection portion can be replaced 445 with the original, expanded criteria selection portion in the updated user interface. An indication of the selected one or more values can be added 450 to the expanded criteria selection portion of the updated user interface. The updated user interface with the expanded criteria selection portion and the indication of the selected one or more values can be provided 455 to the mobile device, for example for display to the user. Examples of such interfaces for a mobile device are illustrated in and described below with reference to FIGS. 5D and 6C.

It should be noted that, in addition to or instead of selecting one or more values from a list of values for the search criteria, a value can be entered directly into the selected control. For example, a user can type or otherwise input a value for a search criteria into a text box or other element comprising either a single-select or a multi-select control. Such a value can then be considered the selected value or, in the case of a multi-select control, an additional selected value. In other words, a value for the search criteria associated with the selected control can be received through the selected control and an indication of the received value adding to the criteria selection portion of the updated user interface.

In any one or more of these different ways, one or more values can be received 460 for the search criteria associated with the selected control through the updated user interface. A search can be performing 465 using the received one or more values for the search criteria associated with the selected control. The criteria selection portion of the user interface can be replaced 470 with a compressed representation in the updated user interface and results of performing the search can be added 475 to the updated user interface. The updated user interface with the compressed representation of the criteria selection portion and the results of performing the search can be provided 480 to the mobile device.

According to one embodiment, these processes can further include an ability to select one of the search results to be used as further criteria for another search. Thus, the process may optionally further include receiving an indication of a selection of a search result through the updated user interface. The compressed representation of the criteria selection portion can be replaced with the criteria selection portion in the updated user interface. An indication of the selected search result adding to the criteria selection portion of the updated user interface as an additional search criteria and the updated user interface with the criteria selection portion and the indication of the selected search result as an additional search criteria can be provided to the mobile device. Upon a confirmation or request, an additional search can then be performed using the received one or more values for the search criteria associated with the selected control and the additional search criteria.

The figures described below provide numerous exemplary interfaces illustrating implementations of the various embodiments of the present invention. These interfaces are provided for illustrative purposes only to provide a more thorough understanding of these embodiments and are not intended to limit the scope of the present invention. Rather, it should be understood that various other user interfaces, differing in many visual as well as functions aspects, may also be utilized with various embodiments of the present invention, depending upon the exact implementation and without departing from the spirit or scope of the present invention. For example, a control within the exemplary user interfaces may be described and illustrated as a textbox or checkbox but may, in other implementations comprise a combobox, icon, link, radio buttons, or any of a variety of other types of interface elements.

Figure 5B:
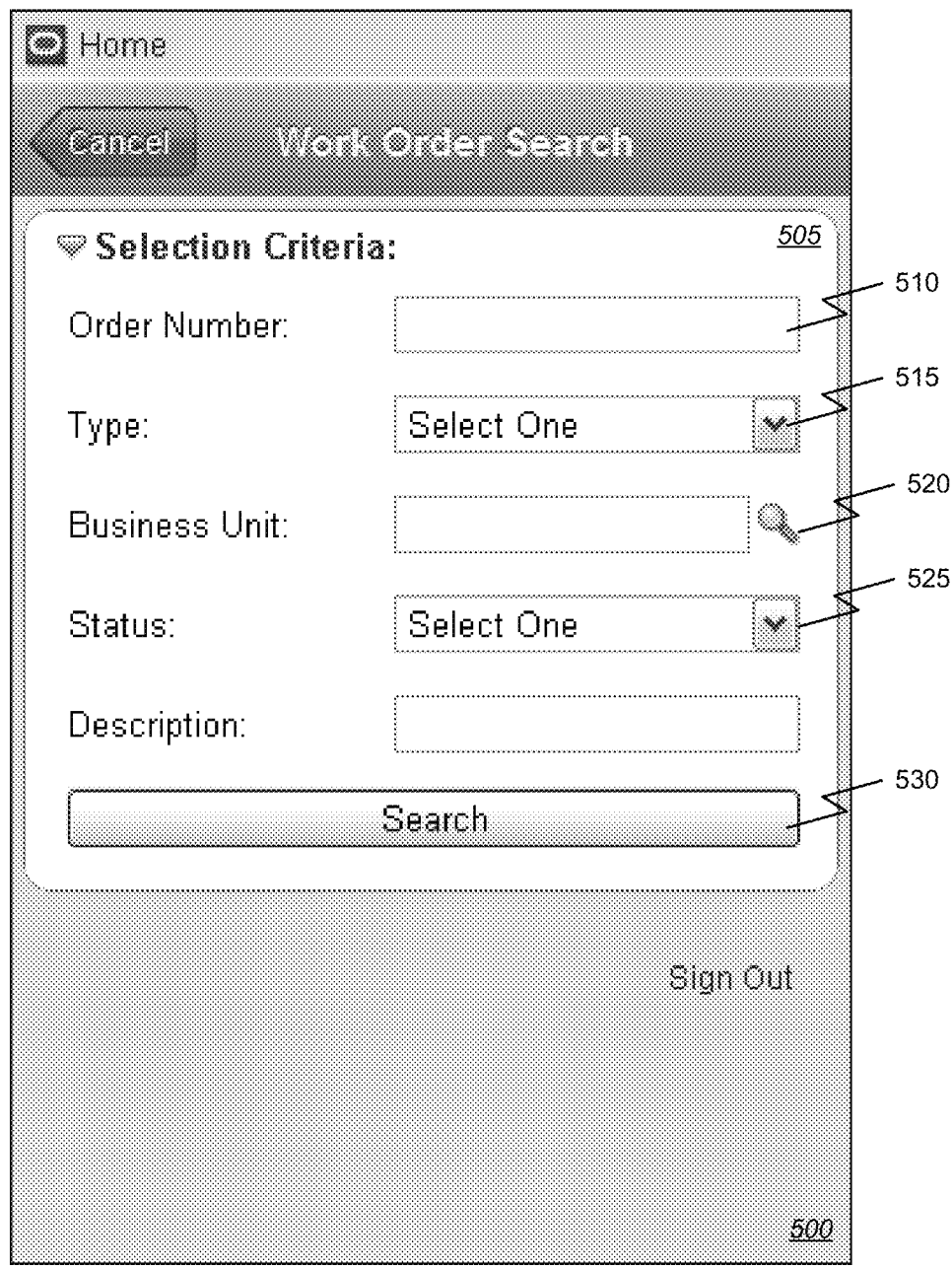

FIGS. 5A-5E are screenshots of exemplary user interfaces for defining single-select criteria according to one embodiment of the present invention. More specifically, FIG. 5A illustrates an example of a user interface 501 of a mobile device which may be presented by an application such as an expense recording application as illustrated here. The interface 501 can include a number of fields 502 and 503 for entering values or otherwise interacting with the application. One or more of these fields 503 can be associated with an icon 504 or other control which, upon selection by the user, can trigger the application to update the user interface for defining criteria as described herein.

For example, FIG. 5B illustrates an example of a user interface 500 that may be generated and presented to a user through a mobile device in a manner as described above and, for example, in response to the user of interface 501 clicking or otherwise selecting a search select icon 504 or other control for or associated with a field 503 of that interface 501. This interface 500 can include a criteria selection portion 505 including a plurality of controls 510, 515, 520, and 525. Each of these controls 510, 515, 520, and 525 can be associated with a search criteria and can provide for a selection of one or more values for the associated search criteria. The interface 500 may also include one or more elements for controlling the operation of the search such as, for example, a button or other control 530 for initiating the search.

As noted above, the interface 500 can be updated based on a user selecting one of the controls 510, 515, 520, and 525. For example, the user may tap or touch or otherwise manipulate the user interface to indicate a selection of one of the controls, such as control 515, and the interface 500 can be updated based on whether this control is a single-select control allowing for selection of one value for the associated criteria or a multi-select control allowing for the selection of one or more values for the associated criteria. In this example, control 515 is a single-select control and FIG. 5C illustrates an example of updating the user interface 500 based on the selection of that control 515.

Figure 5C:
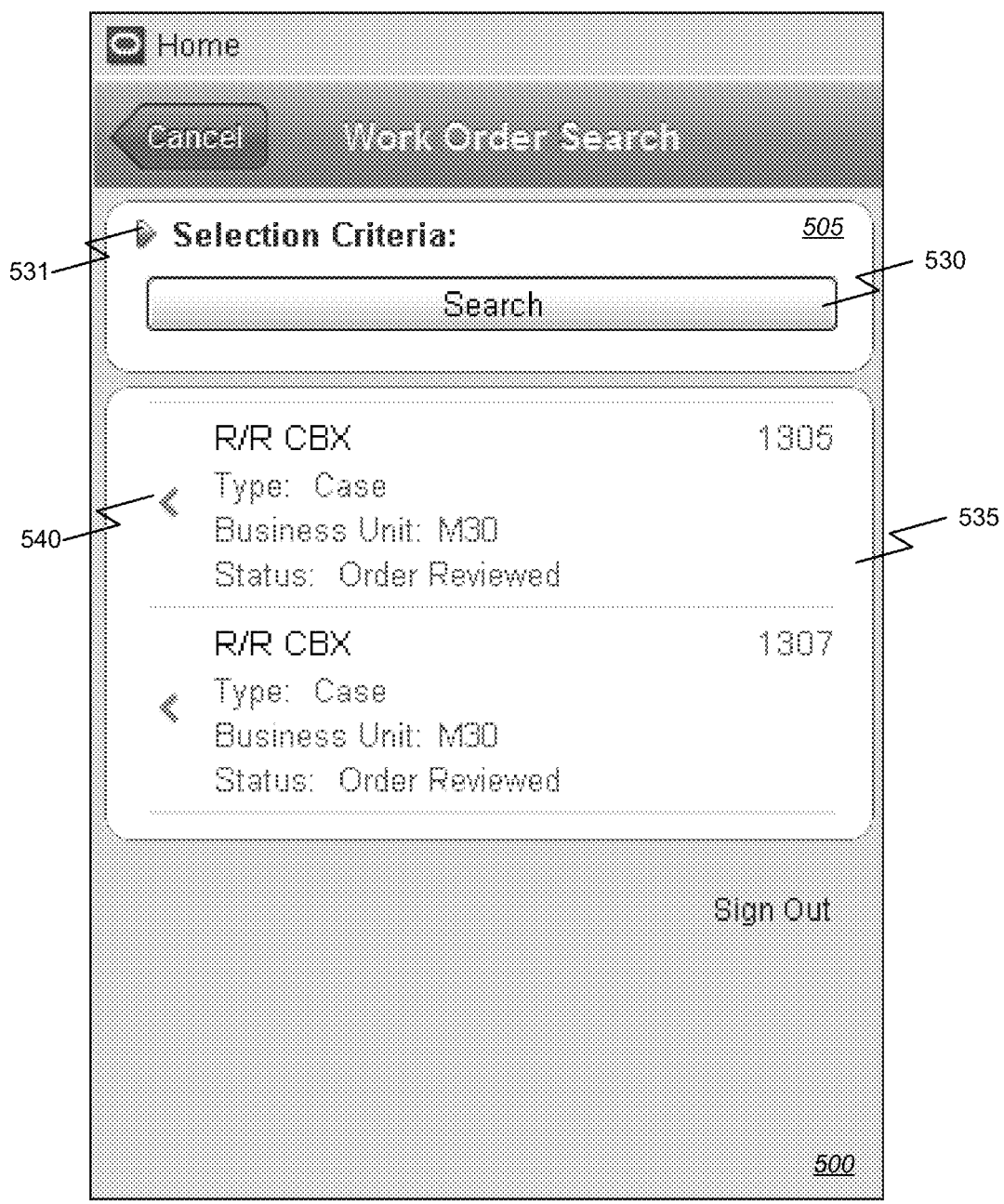

As illustrated in FIG. 5C, updating the user interface 500 based on the selected control 515 can comprise replacing the criteria selection portion 505 with a compressed representation in the updated user interface 500. In this example, the compressed representation includes the control 530 for initiating the search and a control 531 for re-expanding or returning to the original criteria selection view as illustrated in FIG. 5B. However, more or fewer elements may be presented in the compressed criteria selection portion 505 depending upon the exact implementation.

A list of values 535 for the search criteria associated with the selected control 515 can be generated and added to the updated user interface 505. A selection of one of the values of the list 535 can be received through the user interface 500. For example, the values in the list 535 can be associated with a control 540 such as an icon, button, link, or other element which can be manipulated by the user touching, clicking, or otherwise manipulating the user interface to indicate a selection of that value.

Figure 5D:

As illustrated in FIG. 5D, once the value has been selected, the compressed representation of the criteria selection portion can be replaced with the original, expanded criteria selection portion 505 in the updated user interface 500. An indication of the selected value can be added to the expanded criteria selection portion 505 of the updated user interface 500. For example as illustrated here, the value "Case" has been added to the criteria 515 to indicate the user selection received through this interface as represented in FIG. 5C. Additionally or alternatively, the user can add or change a single-select criteria by, for example touching, clicking or otherwise manipulating the user interface to select the control 515 and entering, e.g., typing, the value directly into the control. Again, other variations are contemplated and considered to be within the scope of the present invention.

In any one or more of these different ways, values can be received for the search criteria associated with the selected control through the updated user interface 500. A search can be performing, for example by the user touching or otherwise indicating a selection of the "search" button of other control 530, using the received one or more values for the search criteria associated with the selected control. As a result, the criteria selection portion 505 of the user interface may again be replaced with a compressed representation in the updated user interface and results of performing the search can be added to the updated user interface. The updated user interface with the compressed representation of the criteria selection portion and the results of performing the search can be provided to the mobile device for viewing of the results by the user.

Figure 5E:
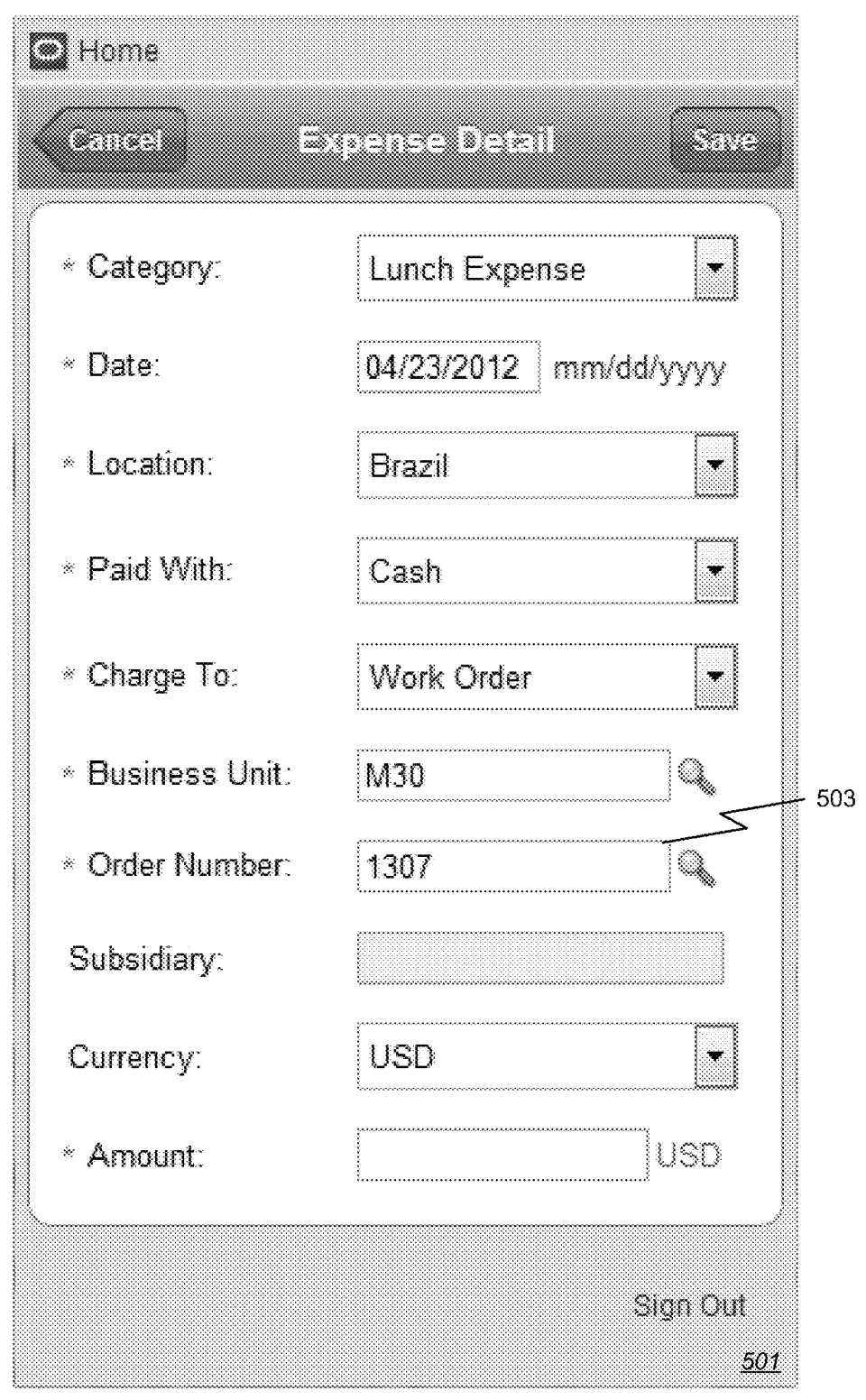

FIG. 5E illustrates an example of the user interface 501 introduced above with reference to FIG. 5A which has been updated to indicate a selected result. As illustrated here, the field 503 associated with the selected control 504 has been updated to include a value selected from the results 535 described above with reference to FIG. 5C. Again, other variations are contemplated and considered to be within the scope of the present invention.

Figure 6A:
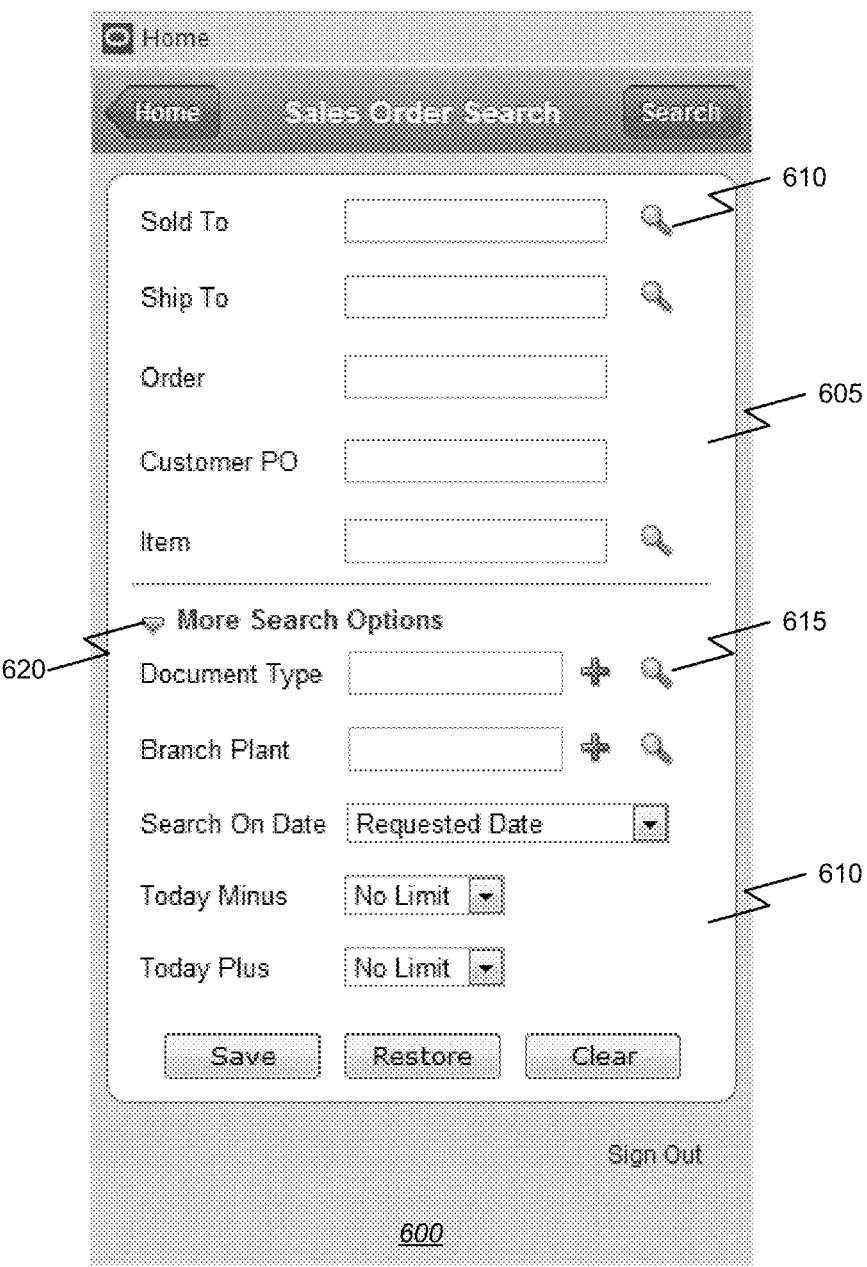
Figure 6B:
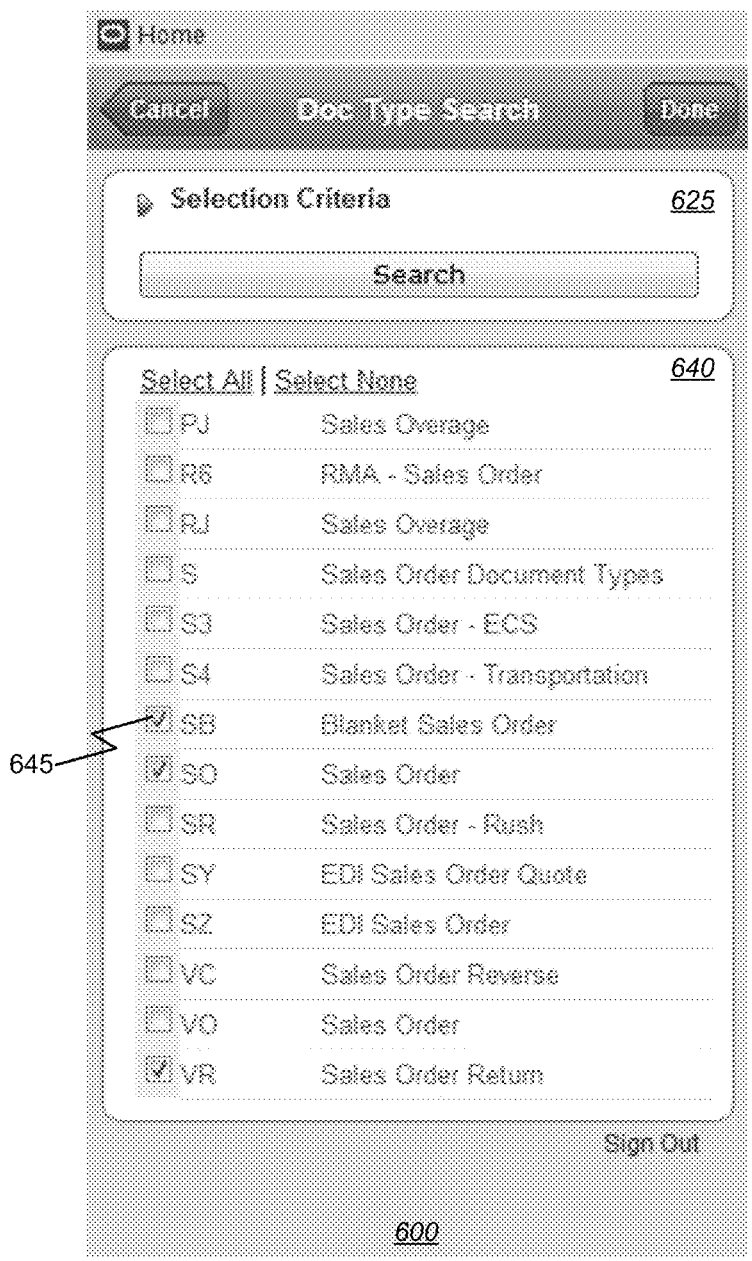

FIGS. 6A-6E are screenshots of exemplary user interfaces for defining single-select criteria according to one embodiment of the present invention. More specifically, FIG. 6A illustrates an example of a user interface 600 that may be generated and presented to a user through a mobile device in a manner as described above. This interface 600 can include criteria selection portions 605 and 610. For example and as illustrated here, a criteria selection portion 610 may include a control 620 such as a button, icon, link, or other element for hiding and showing (i.e., compressing and expanding) that portion 610. Similar to the interface 500 described above, the criteria selection portions 605 and 610 of this interface 600 can include any number of controls for selecting and/or defining single-select and/or multi-select criteria. For example, a criteria selection portion 610 can include a control 615 for selecting and/or defining a multi-select control which, when touched, clicked, or otherwise manipulated by the user through the interface 600 on the mobile device to indicate selection, can cause the interface 600 to be updated such as illustrated in FIG. 6B.

In the case of selection of a control for a multi-select criteria such as control 615, updating the user interface based on the selected control can comprise, as illustrated in FIG. 6B, replacing the criteria selection portions 605 and 610 of the user interface 600 with a compressed representation 625 in the updated user interface. A list of values 640 for the search criteria associated with the selected control 615 can be generated and added to the updated user interface 600. As illustrated in this example, the list 640 can include a number of possible values for the criteria associated with the selected control 615 and each of the values in the list 640 may have associated controls 645 for indicating a selection of one or more values from the list 640. Thus, a selection of one or more values of the list 640 can be received through the user interface, for example by the user touching, clicking, or otherwise manipulating the user interface to indicate one or more selections from the list 640.

Figure 6C:
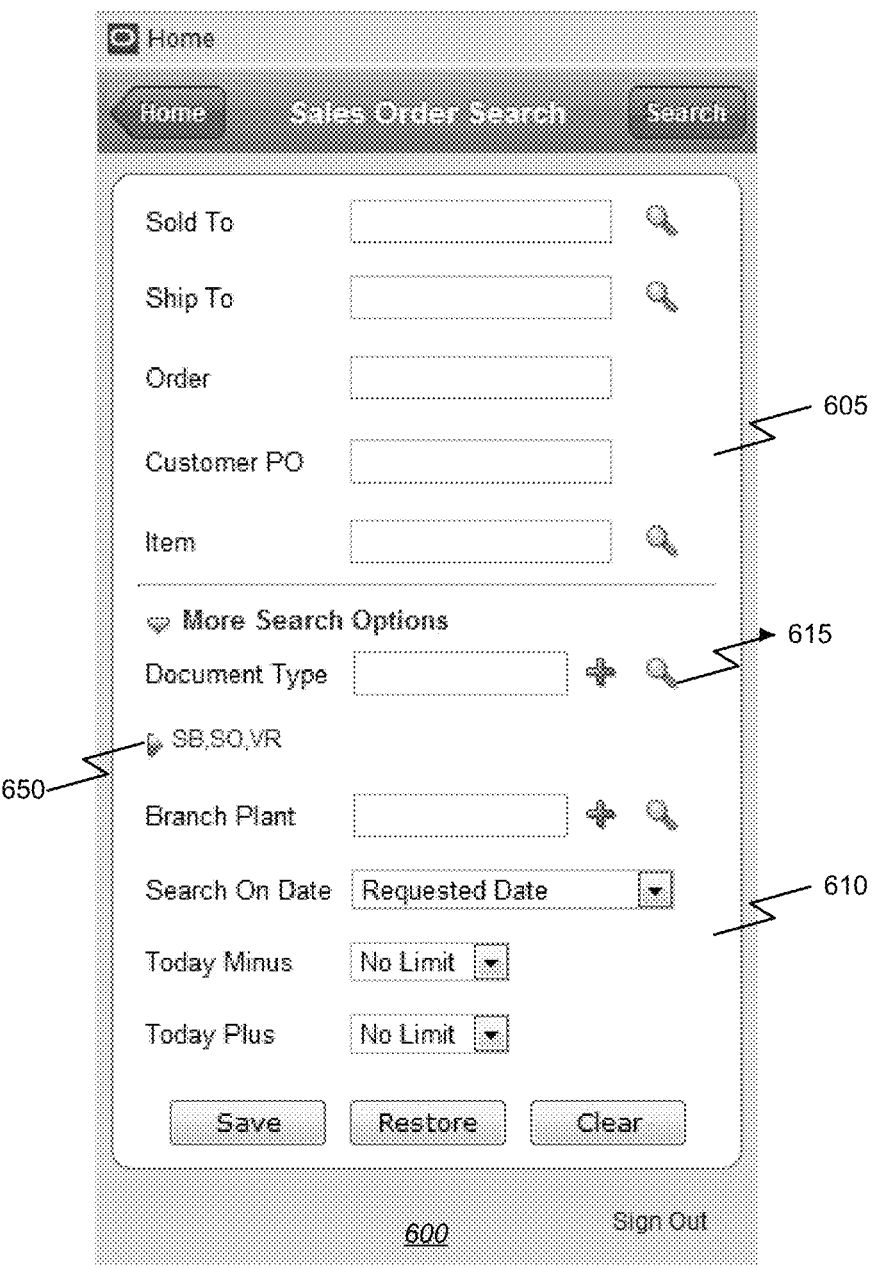
Figure 6D:
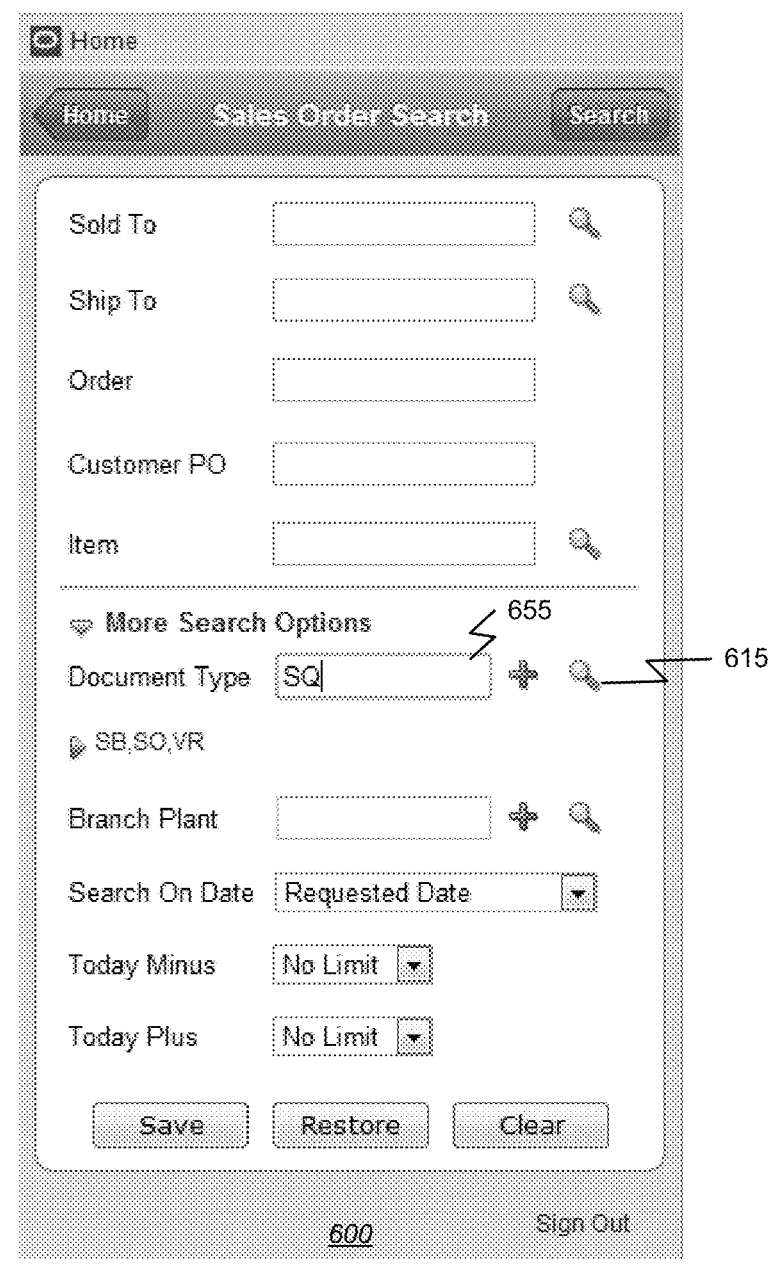
Figure 6E:
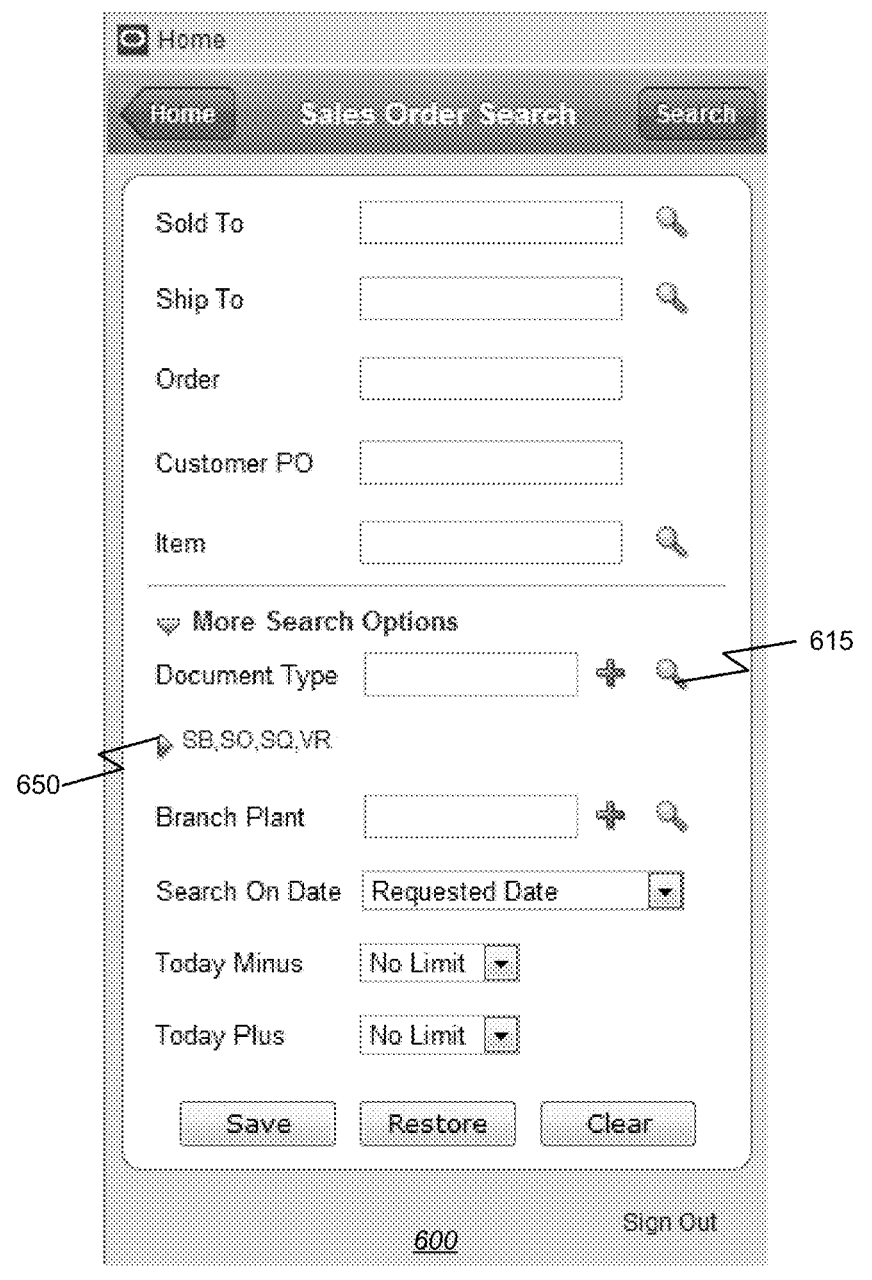

Once one or more values have been selected, the compressed representation 625 of the criteria selection portion can be replaced with the original, expanded criteria selection portions 605 and 610 in the updated user interface 600 as illustrated in FIG. 6C. According to one embodiment, an indication 650 of the selected one or more values can be added to the expanded criteria selection portion 610 of the updated user interface 600 as a visual indication or reminder to the user of the selected values for that criteria. Additionally or alternatively, the user can add or change a multi-select criteria by, for example touching, clicking or otherwise manipulating the user interface to select the control 615 and entering, e.g., typing, the value directly into the control such as illustrated in FIG. 6D. In this example, the user can type or otherwise enter a value into the textbox 655 associated with the selected control. Then, according to a further embodiment, the user interface 600 can be updated to include thus entered value As illustrated in FIG. 6E. In this example, the indication 650 of the selected values is updated to reflect the values added through the textbox 655 of the selected control 615. Again, other variations are contemplated and considered to be within the scope of the present invention.

In any one or more of these different ways, values can be received for the search criteria associated with the selected control through the updated user interface 600. A search can be performing using the received one or more values for the search criteria associated with the selected control. As a result, the criteria selection portions 605 and 610 of the user interface 600 may again be replaced with a compressed representation in the updated user interface and results of performing the search can be added to the updated user interface. The updated user interface with the compressed representation of the criteria selection portion and the results of performing the search can be provided to the mobile device for viewing of the results by the user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing a user interface of a search function for an application, the method comprising:
generating the user interface including a plurality of controls, each control associated with a search criteria type and providing for a selection of one or more values for the associated search criteria, the search criteria type being either a single-select search criteria for selecting and defining a single value for the search criteria associated with the selected control or a multi-select search criteria for selecting and defining a plurality of values for the search criteria associated with the selected control;
providing the user interface to a mobile device;
receiving from the mobile device an indication of a selection of one of the controls;
providing an updated user interface to the mobile device in response to receiving the indication of the selection of one of the controls, wherein the user interface is updated differently based on the search criteria type of the selected control wherein updating the user interface based on the search criteria type of the selected control being a multi-select search criteria comprises:
replacing a criteria selection portion of the user interface with a compressed representation in the updated user interface, the compressed representation including at least a control for initiating the search,
generating a list of values for the search criteria associated with the selected control,
adding the list of values to the updated user interface, and
providing the updated user interface with the compressed representation of the criteria selection portion and list of values to the mobile device;
receiving one or more values for the search criteria associated with the selected control through the updated user interfaces;
receiving a selection of one or more values of the list through the user interface;
replacing the compressed representation of the criteria selection portion with the criteria selection portion in the updated user interface;
adding to the criteria selection portion of the updated user interface an indication of the selected one or more values; and
providing the updated user interface with the criteria selection portion and list and the indication of the selected one or more values to the mobile device.

2. The method of claim 1, further comprising receiving a value for the search criteria associated with the selected control through the selected control.

3. The method of claim 2, further comprising adding to the criteria selection portion of the updated user interface an indication of the received value.

4. The method of claim 3, further comprising:
performing a search using the received one or more values for the search criteria associated with the selected control;
replacing a criteria selection portion of the user interface with a compressed representation in the updated user interface;
adding results of performing the search to the updated user interface; and
providing the updated user interface with the compressed representation of the criteria selection portion and the results of performing the search to the mobile device.

5. The method of claim 4, further comprising:
receiving an indication of a selection of a search result through the updated user interface;
replacing the compressed representation of the criteria selection portion with the criteria selection portion in the updated user interface;
adding to the criteria selection portion of the updated user interface an indication of the selected search result as an additional search criteria; and
providing the updated user interface with the criteria selection portion and the indication of the selected search result as an additional search criteria to the mobile device.

6. The method of claim 5, further comprising performing an additional search using the received one or more values for the search criteria associated with the selected control and the additional search criteria.

7. A system comprising:
a processor; and
a memory coupled with and readable by the processor and having stored therein a sequence of instructions which, when executed by the processor, cause the processor to provide a user interface of a search function for an application by:
generating the user interface including a plurality of controls, each control associated with a search criteria type and providing for a selection of one or more values for the associated search criteria, the search criteria type being either a single-select search criteria for selecting and defining a single value for the search criteria associated with the selected control or a multi-select search criteria for selecting and defining a plurality of values for the search criteria associated with the selected control;
providing the user interface to a mobile device;
receiving from the mobile device an indication of a selection of one of the controls;
providing an updated user interface to the mobile device in response to receiving the indication of the selection of one of the controls, wherein the user interface is updated differently based on the search criteria type of the selected control wherein updating the user interface based on the search criteria type of the selected control being a multi-select search criteria comprises:
replacing a criteria selection portion of the user interface with a compressed representation in the updated user interface, the compressed representation including at least a control for initiating the search,
generating a list of values for the search criteria associated with the selected control,
adding the list of values to the updated user interface, and
providing the updated user interface with the compressed representation of the criteria selection portion and list of values to the mobile device;
receiving one or more values for the search criteria associated with the selected control through the updated user interface;
receiving a selection of one or more values of the list through the user interface;
replacing the compressed representation of the criteria selection portion with the criteria selection portion in the updated user interface;
adding to the criteria selection portion of the updated user interface an indication of the selected one or more values; and
providing the updated user interface with the criteria selection portion and list and the indication of the selected one or more values to the mobile device.

8. The system of claim 7, wherein providing a user interface of a search function for an application further comprises:
receiving a value for the search criteria associated with the selected control through the selected control; and
adding to the criteria selection portion of the updated user interface an indication of the received value.

9. The system of claim 8, wherein providing a user interface of a search function for an application further comprises:
performing a search using the received one or more values for the search criteria associated with the selected control;
replacing a criteria selection portion of the user interface with a compressed representation in the updated user interface;
adding results of performing the search to the updated user interface; and
providing the updated user interface with the compressed representation of the criteria selection portion and the results of performing the search to the mobile device.

10. The system of claim 9, wherein providing a user interface of a search function for an application further comprises:
receiving an indication of a selection of a search result through the updated user interface;
replacing the compressed representation of the criteria selection portion with the criteria selection portion in the updated user interface;
adding to the criteria selection portion of the updated user interface an indication of the selected search result as an additional search criteria; and
providing the updated user interface with the criteria selection portion and the indication of the selected search result as an additional search criteria to the mobile device; and
performing an additional search using the received one or more values for the search criteria associated with the selected control and the additional search criteria.

11. A non-transitory computer-readable medium having stored therein a sequence of instructions which, when executed by a processor, causes the processor to provide a user interface of a search function for an application by:
generating the user interface including a plurality of controls, each control associated with a search criteria type and providing for a selection of one or more values for the associated search criteria, the search criteria type being either a single-select search criteria for selecting and defining a single value for the search criteria associated with the selected control or a multi-select search criteria for selecting and defining a plurality of values for the search criteria associated with the selected control;

providing the user interface to a mobile device;

receiving from the mobile device an indication of a selection of one of the controls;

providing an updated user interface to the mobile device in response to receiving the indication of the selection of one of the controls, wherein the user interface is updated differently based on the search criteria type of the selected control wherein updating the user interface based on the search criteria type of the selected control being a multi-select search criteria comprises:

replacing a criteria selection portion of the user interface with a compressed representation in the updated user interface, the compressed representation including at least a control for initiating the search, generating a list of values for the search criteria associated with the selected control, adding the list of values to the updated user interface, and providing the updated user interface with the compressed representation of the criteria selection portion and list of values to the mobile device;

receiving one or more values for the search criteria associated with the selected control through the updated user interface;

receiving a selection of one or more values of the list through the user interface;

replacing the compressed representation of the criteria selection portion with the criteria selection portion in the updated user interface;

adding to the criteria selection portion of the updated user interface an indication of the selected one or more values; and providing the updated user interface with the criteria selection portion and list and the indication of the selected one or more values to the mobile device.

12. The non-transitory computer-readable medium of claim 11, further comprising:

receiving a value for the search criteria associated with the selected control through the selected control; and adding to the criteria selection portion of the updated user interface an indication of the received value.

13. The non-transitory computer-readable medium of claim 12, further comprising:

performing a search using the received one or more values for the search criteria associated with the selected control;

replacing a criteria selection portion of the user interface with a compressed representation in the updated user interface;

adding results of performing the search to the updated user interface; and providing the updated user interface with the compressed representation of the search criteria selection portion and the results of performing the search to the mobile device.

14. The non-transitory computer-readable medium of claim 13, further comprising:

receiving an indication of a selection of a search result through the updated user interface;

replacing the compressed representation of the criteria selection portion with the criteria selection portion in the updated user interface;

adding to the criteria selection portion of the updated user interface an indication of the selected search result as an additional search criteria;

providing the updated user interface with the criteria selection portion and the indication of the selected search result as an additional search criteria to the mobile device; and performing an additional search using the received one or more values for the search criteria associated with the selected control and the additional search criteria.

\* \* \* \* \*

UNITED STATES PATENT AND TRADEMARK OFFICE
CERTIFICATE OF CORRECTION

PATENT NO. : 9,086,783 B2  
APPLICATION NO. : 13/468635  
DATED : July 21, 2015  
INVENTOR(S) : Nowakowski et al.

Page 1 of 1

It is certified that error appears in the above-identified patent and that said Letters Patent is hereby corrected as shown below:

In the specification,

In column 4, line 35, after "way" delete "that that" and insert -- that --, therefor.

In column 11, line 41, after "value" delete "As" and insert -- as --, therefor.

In the claims,

In column 12, line 53, in claim 1, delete "interfaces;" and insert -- interface; --, therefor.

Signed and Sealed this  
Ninth Day of August, 2016

Michelle K. Lee  
*Director of the United States Patent and Trademark Office*